US009325275B2

(12) United States Patent
Yamada

(10) Patent No.: US 9,325,275 B2
(45) Date of Patent: Apr. 26, 2016

(54) CONTROL APPARATUS AND SHIFT-BY-WIRE SYSTEM USING THE SAME

(71) Applicant: DENSO CORPORATION, Kariya, Aichi-pref. (JP)

(72) Inventor: Jun Yamada, Nagoya (JP)

(73) Assignee: DENSO CORPORATION, Kariya (JP)

( * ) Notice: Subject to any disclaimer, the term of this patent is extended or adjusted under 35 U.S.C. 154(b) by 22 days.

(21) Appl. No.: 14/559,250

(22) Filed: Dec. 3, 2014

(65) Prior Publication Data

US 2015/0160640 A1 Jun. 11, 2015

(30) Foreign Application Priority Data

Dec. 6, 2013 (JP) ................................ 2013-253030

(51) Int. Cl.
G05B 11/01 (2006.01)
H02P 29/02 (2006.01)
F16H 61/24 (2006.01)

(52) U.S. Cl.
CPC ........ H02P 29/027 (2013.01); F16H 2061/247 (2013.01)

(58) Field of Classification Search
CPC .... B62D 5/0484; B62D 5/0487; B62D 5/046; B62D 5/049; H03K 17/0822; H03K 17/687; H03K 2017/0806; H03K 17/18; H03K 17/60; G06N 99/005; F16H 2061/1208; F16H 61/12; F16H 2061/1216; F16H 61/00
USPC ................. 318/400.02, 400.18, 432, 139, 635
See application file for complete search history.

(56) References Cited

U.S. PATENT DOCUMENTS

| 5,221,884 A | | 6/1993 | Teshima | |
|---|---|---|---|---|
| 5,677,611 A | * | 10/1997 | Yoshihara | B60L 3/0023 318/139 |
| 7,813,089 B2 | * | 10/2010 | Suzuki | B62D 5/046 180/443 |
| 7,847,702 B2 | * | 12/2010 | Takahashi | H03K 17/0822 324/509 |
| 7,859,206 B2 | * | 12/2010 | Suzuki | B62D 5/046 318/400.02 |
| 7,880,417 B2 | * | 2/2011 | Suzuki | B62D 5/0484 318/400.02 |
| 8,054,602 B2 | * | 11/2011 | Takahashi | H03K 17/0822 361/101 |
| 8,598,859 B2 | * | 12/2013 | Furuichi | H03K 17/0822 323/274 |
| 2006/0138880 A1 | | 6/2006 | Kimura et al. | |
| 2006/0207373 A1 | | 9/2006 | Amamiya et al. | |

(Continued)

OTHER PUBLICATIONS

Office Action (1 pg.) dated Oct. 1, 2015 issued in corresponding Japanese Application No. 2013-253030 with an at least partial English-language translation (2 pgs.).

(Continued)

Primary Examiner — Paul Ip
(74) Attorney, Agent, or Firm — Nixon & Vanderhye PC

(57) ABSTRACT

A current limiting circuit restricts electric currents flowing through windings and MOSs such that an average of a current value of the electric currents detected by a current detection circuit is within a predetermined value span. An MPU functions as a reference position learning controller that performs a reference position learning control to restrict the electric currents that flow through the windings and the MOSs using the current limiting circuit while rotating a motor until a detent plate stops at a limit position of a working span, to thereby learn the reference position of the motor. An anomaly detection section of the MPU functions as an anomaly detection controller to detect an anomaly in the current limiting circuit based on the current value detected by the current detection circuit during the reference position learning control.

4 Claims, 5 Drawing Sheets

(56) References Cited

U.S. PATENT DOCUMENTS

| | | | |
|---|---|---|---|
| 2008/0048877 A1* | 2/2008 | Takahashi | H03K 17/0822 340/653 |
| 2008/0203963 A1* | 8/2008 | Suzuki | B62D 5/046 318/799 |
| 2008/0290829 A1* | 11/2008 | Suzuki | B62D 5/046 318/563 |
| 2008/0297958 A1* | 12/2008 | Suzuki | B62D 5/0484 361/31 |
| 2008/0309270 A1* | 12/2008 | Suzuki | B62D 5/0484 318/432 |
| 2009/0039822 A1 | 2/2009 | Kimura et al. | |
| 2009/0167272 A1* | 7/2009 | Furuichi | H03K 17/687 323/284 |
| 2010/0052595 A1 | 3/2010 | Kimura et al. | |
| 2013/0278198 A1* | 10/2013 | Ito | B62D 5/049 318/490 |
| 2013/0320893 A1* | 12/2013 | Aoki | B62D 5/0484 318/400.18 |
| 2015/0160625 A1* | 6/2015 | Yoshida | H02P 25/00 318/561 |
| 2015/0160631 A1* | 6/2015 | Yoshida | G05B 15/02 700/275 |
| 2015/0160639 A1* | 6/2015 | Yoshida | G05B 19/048 318/635 |

OTHER PUBLICATIONS

Yoshida, U.S. Appl. No. 14/559,284, filed Dec. 3, 2014.

* cited by examiner

CONTROL APPARATUS AND SHIFT-BY-WIRE SYSTEM USING THE SAME

CROSS REFERENCE TO RELATED APPLICATION

The present application is based on Japanese Patent Application No. 2013-253030 filed on Dec. 6, 2013, the disclosure of which is incorporated herein by reference.

TECHNICAL FIELD

The present disclosure relates to a control apparatus that controls the drive of a motor, and a shift-by-wire system using the same.

BACKGROUND ART

Patent Literature 1: JP 2004-308752 A (US 2006/0207373 A1)

There is conventionally known in vehicle controls a by-wire system to permit a by-wire control circuit to perform electrical control on actuators that change vehicle states according to instructions from drivers of vehicles. For example, Patent Literature 1 discloses a shift-by-wire system to switch the shift range according to driver's instructions. This system controls the drive of an actuator with a brushless motor and rotates a detent plate in the shift-range switching apparatus, switching the shift range.

The shift-by-wire system in Patent Literature 1 switches the shift range to a target range by rotating the motor to a target rotational position corresponding to the target range based on a counted value of pulse signals from an encoder that outputs the pulse signals every predetermined rotational angle in synchronization with the rotation of the motor. In addition, the shift-by-wire system in Patent Literature 1 performs a reference position learning control that learns a reference position of the motor by rotating the motor until the detent plate stops at a limit position in a working span, before starting the control of the shift range (i.e., before starting a usual drive control of the motor). Learning the reference position permits the limit position to accord with the reference position of the motor, subsequently enabling a usual drive control that rotates the motor to a target rotational position.

There is a system that controls electric currents flowing through each phase of the motor based on a duty ratio depending on voltages when a reference position learning control is performed. In such a system, a current value of electric currents flowing through each phase of the windings of the motor changes with the change of the winding resistance due to temperature variations, time-based variations, etc. even if the voltage is maintained unchanged; the changed current value poses the change in the torque of the motor. This may deteriorate the accuracy in learning the reference position. Such an issue is not considered by the system in Patent Literature 1. The system in Patent Literature 1 may therefore deteriorate the accuracy in learning a reference position because of such condition variations as temperature variations or time-based variations.

In order to improve the accuracy in learning of a reference position, the electric currents flowing through the windings may be limited such that the sum of the electric currents flowing through the respective winding phases of the motor is kept within a predetermined span; this suppresses the variation in the current value of each phase due to the temperature variations or time-based variations. A physical (i.e., hardware) circuit may be employed to form a device detecting the sum of the electric currents that flow through each winding phase of the motor, or a device restricting the electric currents that flow through the windings. Such a physical circuit may however break down, disabling accurate learning of a reference position.

SUMMARY

It is an object of the present disclosure to provide (i) a control apparatus that has a high accuracy in learning a reference position and detects an anomaly in a function related to the learning of the reference position, and (ii) a shift-by-wire system using the control apparatus.

To achieve the above object, according to an example of the present disclosure, a control apparatus is provided to control a motor that includes windings with a plurality of phases. The motor rotates on electric power from a power source to rotate and drive a driving target. The control apparatus includes: a plurality of switching devices; a drive controller; a current detection circuit; a current limiting circuit; a reference position learning controller; and an anomaly detection controller. The plurality of switching devices are provided to correspond to the respective phases of the windings. Each switching device permits current application to corresponding windings by performing ON operation and shuts down the current application to the corresponding windings by performing OFF operation. The drive controller controls driving of the motor by controlling the ON operation or the OFF operation of each switching device. The current detection circuit detects a current value of electric currents flowing through the windings and the switching devices. The current limiting circuit restricts the electric currents flowing through the windings and the switching devices so that an average of the current value detected by the current detection circuit is within a predetermined value span. The reference position learning controller performs a reference position learning control that rotates the motor until the driving target stops at a limit position of a working span while restricting the electric currents flowing through the windings and the switching devices by using the current limiting circuit, to thereby learn a reference position of the motor. The anomaly detection controller detects an anomaly in the current limiting circuit based on the current value detected by the current detection circuit while the reference position learning control is performed by the reference position learning controller.

Under such a configuration, when the reference position of the motor is learned, the motor is rotated while the current limiting circuit restricts the electric currents that flow through the windings and the switching devices based on the current value detected by the current detection circuit. This suppresses (i) variations in a current value of each phase due to such variations as temperature variations, time-based variations, and (ii) variations in the torque of the motor. The learning accuracy of a reference position can be thus raised irrespective of such variations of conditions as temperature variations, time-based variations.

Further, the anomaly detection controller can detect an anomaly in the current limiting circuit based on the current value detected by the current detection circuit. This can avoid the learning of a reference position under the state where an anomaly occurs in the current limiting circuit. The incorrect learning of a reference position is thus prevented from causing an out-of-control situation or a malfunction of the motor.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

The following will explain embodiments of the present disclosure with reference to drawings.

(First Embodiment)

Figure 1:
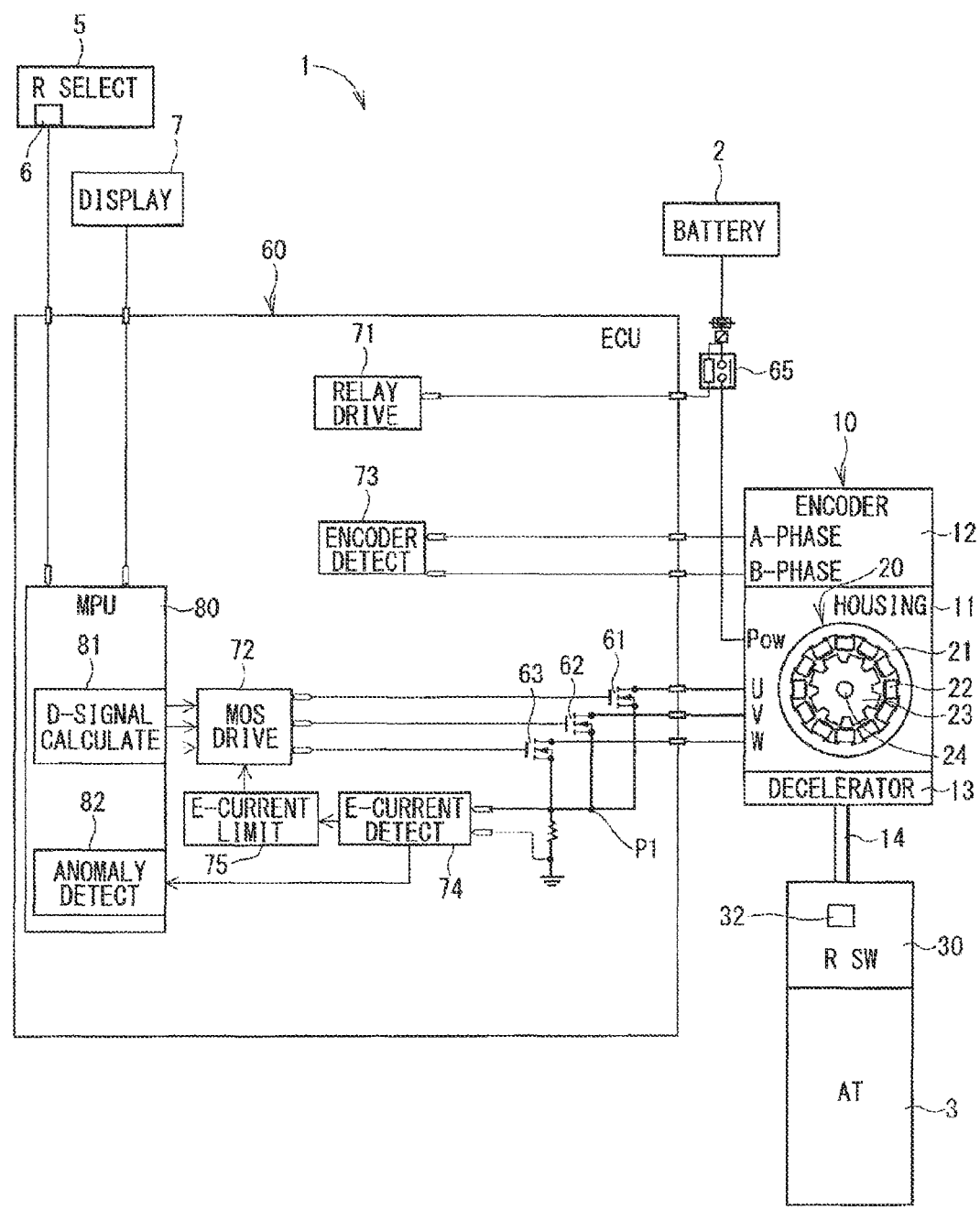
FIG. 1 is a diagram schematically illustrating a control apparatus and a shift-by-wire system using the same, which are according to a first embodiment of the present disclosure.

FIG. 1 schematically illustrates a control apparatus and a shift-by-wire system using the same, which are according to a first embodiment of the present disclosure.

The shift-by-wire system 1 includes an actuator 10, a shift-range switching apparatus 30, and an electronic control unit (ECU) 60 serving as a control apparatus. The shift-by-wire system 1 is mounted in a vehicle, together with an automatic transmission 3, for instance; the shift-by-wire system 1 drives the actuator 10 and the shift-range switching apparatus 30 based on instructions by a driver of the vehicle, switching the shift range of the automatic transmission 3 through a by-wire control.

The actuator 10 includes a housing 11, a motor 20, an encoder 12, a decelerator 13, and an output axis 14. The motor 20 is a three-phase drive brushless motor that generates a driving force without any permanent magnet, such as a switched reluctance (SR) motor in the present embodiment. The motor 20 includes a stator 21, windings 22, a rotor 23, and a motor shaft 24.

The stator 21 is shaped of a circular ring that laminates a plurality of griddles, for example, and is fixedly contained inside of the housing 11. The stator 21 includes a plurality of salient poles, which are arranged with equally-spaced intervals along a circumferential direction to be each projected to the inner side along a radial direction. The stator 21 includes twelve salient poles.

A plurality of windings 22 are provided to each wind each salient pole of the stator 21. The windings 22 correspond to a plurality of phases (U phase, V phase, W phase) of the motor 20. Under the present embodiment, respective four windings 22 among all the twelve windings 22 correspond to each of the U phase, V phase, and W phase.

The rotor 23 is shaped of a circular cylinder that laminates a plurality of griddles, for example, and is pivotally contained inside of the stator 21. The rotor 23 includes a plurality of salient poles, which are arranged with equally-spaced intervals along a circumferential direction to be each projected to the outer side along a radial direction. The rotor 23 includes eight salient poles.

The motor shaft 24 is arranged at a center of the rotor 23 and integrated with the rotor 23 to be rotatable or pivotable along with the rotor 23. The motor shaft 24 is supported rotatably or pivotably by the housing 11. This permits the rotor 23 to rotate along with the motor shaft 24 inside of the stator 21.

Switching the current application to the windings 22 of the respective phases in turn produces a rotating magnetic field in the stator 21 to rotate the rotor 23. The motor 20 rotates by receiving an electric power from a battery 2 as a power source of the vehicle. The ECU 60 switches the current application from the battery 2 to the windings 22 of the respective phases, controlling the drive of the motor 20.

The encoder 12 is arranged inside of the housing 11 of the actuator 10. The encoder 12 includes a magnet integrally rotating with the rotor 23, and a Hall IC for magnetic detection, the Hall IC which is mounted in a substrate fixed to the housing 11 to be opposed to the magnet for detecting the passage of a magnetic flux generating portion in the magnet. The encoder 12 outputs pulse signals of A phase or B phase depending on the changed portion of the rotational angle of the motor 20 (rotor 23).

The decelerator 13 decelerates a rotational movement of the motor shaft 24 of the motor 20 and outputs a rotational driving force via an output axis 14 to the shift-range switching apparatus 30. The shift-range switching apparatus 30 transmits the rotational driving force from the decelerator 13 to a manual valve 4 and a parking lock mechanism 50 (refer to FIG. 2).

Figure 2:
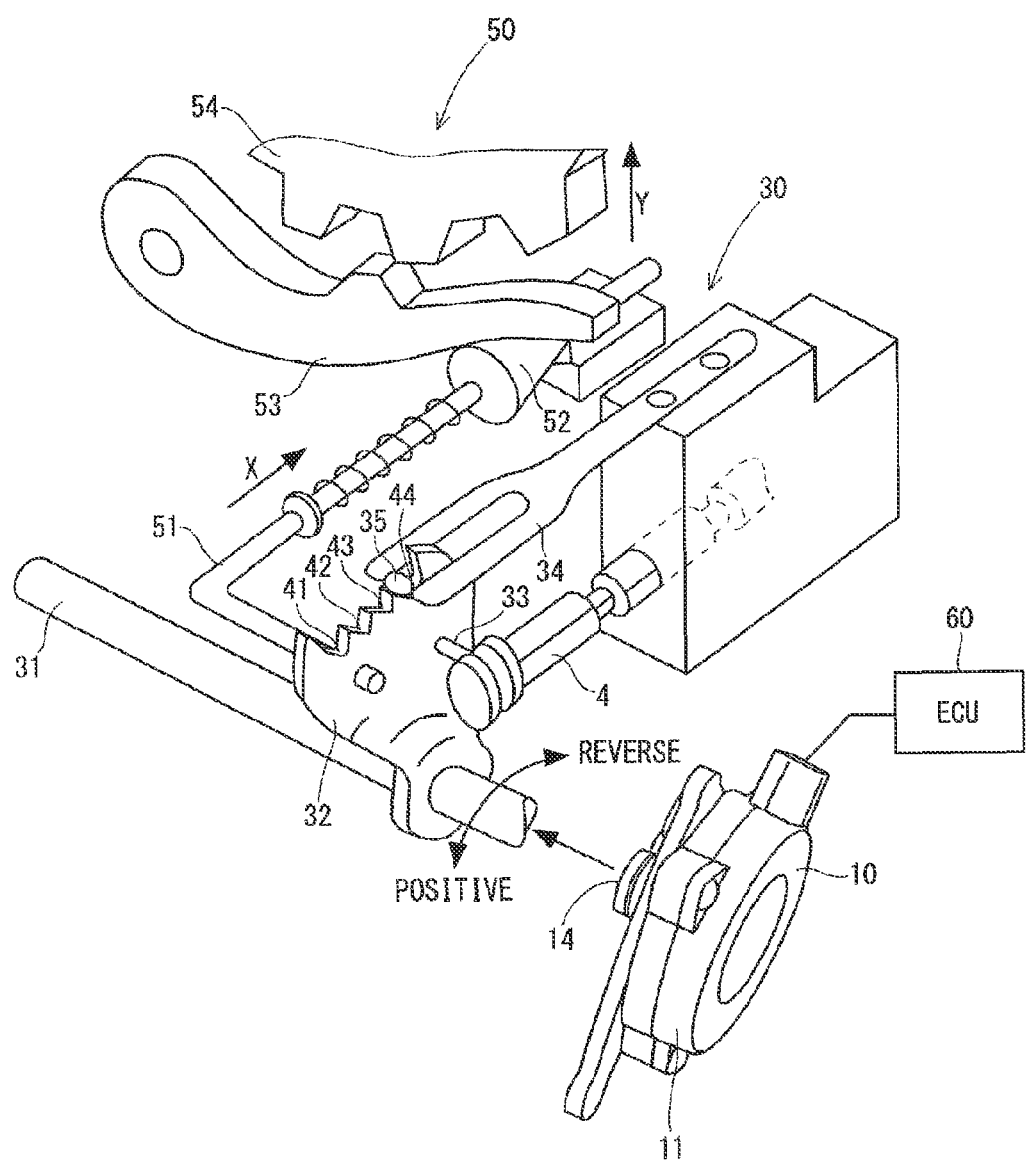
FIG. 2 is a perspective view illustrating a shift-range switching apparatus employing the control apparatus.

The shift-range switching apparatus 30 includes a manual shaft 31, a detent plate 32, and a detent spring 34, as indicated in FIG. 2. The manual shaft 31 is connected to the output axis 14 of the actuator 10, and is rotated and driven due to the rotational driving force of the motor 20. The detent plate 32 is integrated with the manual shaft 31 and is extended from the manual shaft 31 to the outer side along the radial direction. This configuration permits the actuator 10 to rotate the detent plate 32 integrally with the manual shaft 31. The detent plate 32 may be also referred to as a driving target.

The detent plate 32 is provided with a pin 33 that is projected in parallel with the manual shaft 31. The pin 33 is connected with the manual valve 4. Therefore, when the detent plate 32 rotates along with the manual shaft 31, the manual valve 4 moves reciprocally in an axial direction. That is, the shift-range switching apparatus 30 converts the rotational driving force of the actuator 10 into the straight-line motion, and transmits the converted force to the manual valve 4.

The detent plate 32 includes recessed portions 41, 42, 43, and 44 on the outer side in the radial direction of the manual shaft 31. The recessed portion 41 is formed in one outer end in the rotational direction of the detent plate 32. The recessed portion 44 is formed in the other outer end in the rotational direction of the detent plate 32. The recessed portions 42 and 43 are formed in between the recessed portion 41 and the recessed portion 44.

In the present embodiment, the recessed portion 41 is formed to correspond to "P range" being the shift range of the automatic transmission 3. The recessed portion 42 is formed to correspond to "R range." The recessed portion 43 is formed to correspond to "N range." The recessed portion 44 is formed to correspond to "D range."

The detent spring 34 is formed to be elastically deformed and includes a detent roller 35 as a restricting portion at the leading end. The detent spring 34 biases the detent roller 35 in the direction to the center (manual shaft 31) of the detent plate 32. When a predetermined force via the manual shaft 31 acts on the detent plate 32 in the rotational direction, the detent roller 35 gets over a protruding portion between the recessed portions 41 to 44 and moves to a neighboring recessed portion 41 to 44. Therefore, the rotation of the manual shaft 31 by the actuator 10 changes the position of the manual valve 4 in the axial direction and the state of a parking lock mechanism 50, resulting in changing the shift range of the automatic transmission 3. It is noted that when the detent roller 35 gets over a protruding portion between the recessed portions 41 to 44, the detent spring 34 is elastically deformed to be bent. In addition, at the same time, the detent roller 35 rotates and transfers over the respective recessed portions 41 to 44 and protruding portions.

The detent roller 35 gets in any one of the recessed portions 41, 42, 43, and 44, restricting the rotation of the detent plate 32. This can determine the position of the manual valve 4 in the axial direction and the state of the parking lock mechanism 50, resulting in fixing the shift range of the automatic transmission 3. Thus, the detent plate 32 and the detent roller 35 may be referred to as a detent mechanism.

With reference to FIG. 2, the rotational direction of the output axis 14 of the actuator 10 is defined as a positive rotation direction when the shift range changes from "P range" via "R range" and "N range" to "D range." In contrast, the rotational direction of the output axis 14 of the actuator 10 is defined as a reverse rotation direction when the shift range changes from "D range" via "N range" and "R range" to "P range."

FIG. 2 indicates the state of the parking lock mechanism 50 in D range other than P range. This state prevents a parking gear 54 from being locked by a parking lock pawl 53 to permit the wheels of the vehicle to rotate without interference. When the output axis 14 of the actuator 10 rotates in the reverse direction from this state, the rod 51 is pressed in the direction of the arrow X indicated in FIG. 2 via the detent plate 32, and the taper portion 52 provided at the leading end of the rod 51 pushes up the parking lock pawl 53 in the direction of the arrow Y indicated in FIG. 2. The parking lock pawl 53 is thereby engaged with the parking gear 54, locking the parking gear 54. This results in restricting the rotation of the wheels. At this time, the detent roller 35 of the detent spring 34 is entering in the recessed portion 41 of the detent plate 32, (i.e., state that the detent roller 35 is located at the center of the recessed portion 41). The actual range of the automatic transmission 3 is the "P range."

The following will explain the ECU 60 in detail. The ECU 60 is a small computer that includes: a micro processing unit (MPU) as a computation device or controller; a RAM and ROM as a storage device; a circuit; and an input and output device. The ECU 60 operates to control the various apparatuses or instruments according to the various programs stored in the ROM based on (i) signals from the various sensors mounted in the vehicle and/or (ii) the data stored in the ROM and RAM. The ECU 60 is electrically connected to the battery 2 that is a power source of the vehicle, and operates on the electric power supplied from the battery 2.

With reference to FIG. 1, the ECU 60 includes a relay 65, MOSs 61, 62, and 63, a relay drive circuit 71, a MOS drive circuit 72, an encoder detection circuit 73, a current detection circuit 74, a current limiting circuit 75, and an MPU 80. The relay 65 is provided in between the battery 2 and the motor 20 and permits or stops the supply of the electric power from the battery 2 to the motor 20 at ON operation or OFF operation, respectively.

Three MOSs 61, 62, and 63 are switching elements such as MOSFETs, and provided to correspond to three respective phases of the windings 22 of the motor 20. The U-phase windings 22 are connected to a drain terminal of the MOS 61 via a conductive wire. The V-phase windings 22 are connected to a drain terminal of the MOS 62 via a conductive wire. The W-phase windings 22 are connected to a drain terminal of the MOS 63 via a conductive wire.

One end of each of the conductive wires is connected to each source terminal of the MOSs 61, 62, and 63. The other end of each of the conductive wires is connected mutually to a merging point P1. The merging point P1 is connected to the low potential side of the battery 2, i.e., the ground, via a resistor. The MPU 80 is a semiconductor chip that performs various computations.

The relay drive circuit 71 is connected to the relay 65. The relay drive circuit 71 outputs an ON signal to the relay 65 to permit the ON operation of the relay 65 to move the relay 65 to the ON state. In the present embodiment, when the ON signal is not outputted to the relay 65, the relay 65 is in the OFF state.

The MPU 80 controls the relay drive circuit 71 to control the ON state/OFF state of the relay 65. The ON state of the relay 65 permits the supply of the electric power from the battery 2 to the motor 20 to rotate the motor 20.

The MOS drive circuit 72 is connected to each gate terminal of the MOSs 61, 62, and 63. The MOS drive circuit 72 outputs an ON signal (drive signal) to each of the gate terminals of the MOSs 61, 62, and 63 to permit the ON operation of each of the MOSs 61, 62, and 63 to move the MOSs 61, 62, and 63 to the ON state. In the present embodiment, when the ON signal is not outputted to each of the MOSs 61, 62, 63, they are in the OFF state.

The MPU 80 includes a drive signal calculation section 81 as a functional section. The MPU 80 calculates drive signals to the respective MOSs 61, 62, and 63 in the drive signal calculation section 81, and controls the MOS drive circuit 72 so that the calculated drive signals are outputted from the MOS drive circuit 72, thereby controlling the ON state/OFF state of the MOSs 61, 62, and 63. For example, when the relay 65 is in the ON state and, simultaneously, the MOS 61 is in the ON state, the electric currents flow through or into the U-phase windings 22. When the relay 65 is in the ON state and, simultaneously, the MOS 62 is in the ON state, the electric currents flow through or into the V-phase windings 22. When the relay 65 is in the ON state and, simultaneously, the MOS 63 is in the ON state, the electric currents flow through or into the W-phase windings 22. In contrast, when the MOSs 61, 62, and 63 each are in the OFF state, the electric currents do not flow through or into the windings 22 with the corresponding phase. The MOSs 61, 62, and 63 may be each referred to as a switching device.

The MPU 80 controls the ON/OFF operation of the MOSs 61, 62, and 63 via the MOS drive circuit 72, to control the drive of the motor 20. It is noted that the MPU 80 (i.e., drive signal calculation section 81) and the MOS drive circuit 72 may be also referred to as a drive controller.

The encoder detection circuit 73 is connected with the encoder 12. The encoder 12 outputs pulse signals with A phase or B phase to the encoder detection circuit 73 depending on the changed portion of the rotational angle of the motor 20 (rotor 23). The ECU 60 can detect, of the encoder 12, the pulse signals that are detected by the encoder detection circuit 73.

As explained above, the encoder 12 in the present embodiment is an incremental encoder that outputs pulse signals depending on rotation of the motor 20. The ECU 60 decreases (counts down) or increases (counts up) the value for the count (pulse-signal counted value) depending on the pulse signals outputted from the encoder 12. This permits the ECU 60 to detect the rotating state of the motor 20 (rotor 23). That is, the ECU 60 enables the high velocity rotation of the motor 20 without the motor 20 stepping out by detecting the rotation state of the motor 20 using the encoder 12. Each time the vehicle power is turned on (i.e., each activation of the shiftby-wire system 1), an initial drive control is conducted for the learning of the current application phase in magnetization of the motor 20 (synchronization of the current application phase with the counted value according to pulse signals outputted from the encoder 12). The initial drive control permits the actuator 10 to rotate appropriately.

The current detection circuit 74 is arranged to be connected with the merging point P1 where the electric currents flowing through the windings 22 and the MOSs 61, 62, and 63 merge. The current detection circuit 74 thereby detects the current value of the electric currents that flow through the merging point P1. The MPU 80 can detect the current value of the electric currents which flow through the merging point P1 via the current detection circuit 74.

The current limiting circuit 75 is arranged to be connected with the current detection circuit 74 and the MOS drive circuit 72. The current limiting circuit 75 controls the MOS drive circuit 72 so that the average of the current value detected by the current detection circuit 74 (e.g., the average of the current values that are detected for a predetermined time period) is within a predetermined value span, thereby restricting the electric currents flowing through the windings 22 and the MOSs 61, 62, and 63.

The ECU 60 is electrically connected to the selector sensor 6 of the range selector 5 as a shift selection device (refer to FIG. 1). The selector sensor 6 detects a range (hereinafter referred to "instruction range") that is indicated by a driver of the vehicle manipulating the range selector 5. The selector sensor 6 outputs the detected signal to the MPU 80 of the ECU 60.

The MPU 80 of the ECU 60 determines a target range based on the signal about the instruction range outputted from the selector sensor 6. To be specific, the present embodiment determines a target range based on such signals as signals of the selector sensor 6, signals of the brake, or signals of the speed sensor. The ECU 60 controls the rotation of the actuator 10 so that the shift range of the automatic transmission 3 moves to or turns into the determined target range. That is, the shift range is switched into the target range by rotating the motor 20 to a target rotational position corresponding to the target range. The actual range of the automatic transmission 3 thereby switches into the range which the driver intends to select.

The encoder 12, which is an incremental one in the present embodiment, can detect a relative rotational position of the motor 20 (rotor 23) alone. Switching the shift range into the desired range by rotating the motor 20 thereby requires the learning of a reference position corresponding to an absolute position of the motor 20 and matching such a reference position with a limit position of a working span (rotatable span) of the detent plate 32. After the learning of the reference position of the motor 20, a rotational position of the motor 20 corresponding to each shift range is calculated based on the learned reference position and a predetermined rotation quantity (control parameter). The motor 20 is rotated to meet the calculated rotational position; this switches the actual range into the desired shift range. In the present embodiment, the MPU 80 of the ECU 60 learns the reference position of the motor 20 corresponding to the end portion (P range or D range) of the working span of the detent plate 32.

In addition, after learning the reference position, the MPU 80 of the ECU 60 detects indirectly the actual range through the calculation based on the reference position, the predetermined rotation quantity, and the pulse-signal counted value (rotational position of the motor 20) from the encoder 12. In the present embodiment, the ECU 60 displays the information on the detected actual range on a display apparatus 7, which is arranged in front of the driver's seat in the vehicle, for instance. The driver of the vehicle can thus confirm the actual range at the time. In the present embodiment, the actual range is detectable based on the rotational position of the motor 20 at the time when the center of the detent roller 35 is located within the span of each of the recessed portions 41, 42, 43, and 44 of the detent plate 32 corresponding to the shift range (P, R, N, D).

Now, the MPU 80 performs the reference position learning control by controlling the electric currents that flow in each phase of the motor 20 by using the duty ratio according to the voltage. In this case, even if the voltage is the same, the value of the electric currents which flow in each phase of the windings 22 of the motor 20 may change with the change in the winding resistance due to such variations as temperature variations, time-based variations. The torque of the motor 20 may be thus changed; this may deteriorate the learning accuracy of the reference position.

To that end, when the reference position learning control is performed in the present embodiment, the current detection circuit 74 and the current limiting circuit 75 are provided to restrict the electric currents flowing through the windings 22 and the MOSs 61, 62, and 63 such that the average of the current value of the electric currents which flow through the merging point P1 is within a predetermined span (i.e., a predetermined value-span), as explained above. This suppresses the change of the current value in each phase due to such variations as temperature variations, time-bases variations, and improves the learning accuracy of the reference position irrespective of the conditions that may vary.

In the present embodiment, while restricting the electric currents that flow through the windings 22 and MOSs 61, 62, and 63 in the current limiting circuit 75, the MPU 80 rotates the motor 20 until the detent plate 32 stops at the limit position (position corresponding to P range or D range) of the working span. At this time, the MPU 80 rotates the motor 20 (rotor 23) under "two-phase current application mode", which switches the current application phases one by one while applying electric currents to two phases among three phases of the windings 22. The MPU 80 learns the reference position based on the counted value of the pulse signal from the encoder 12 after a predetermined time period elapses since the rotation of the motor 20 stops.

Thus, in the present embodiment, while restricting the electric currents that flow through the windings 22 and MOSs 61, 62, and 63 in the current limiting circuit 75, the MPU 80 rotates the motor 20 until the detent plate 32 stops at the limit position (position corresponding to P range or D range) of the working span and learns the reference position of the motor 20. The MPU 80 may be also referred to as a reference position learning controller, device, or means. In addition, the control about the learning of the reference position by the MPU 80 may be also referred to as a reference position learning control. In addition, when the reference position learning control is performed, the motor 20 is rotated so that the detent roller 35 hits against the wall portion of the recessed portion 41 or the recessed portion 44 corresponding to P range or D range. Thus the reference position learning control may be also referred to as a wall hitting learning control or a hitting learning control.

The MPU 80 usually rotates the rotor 23 to the target rotational position by switching the current application phases of the windings 22 of the motor 20 one by one, while detecting the rotational position of the rotor 23 with respect to the stator 21 based on the pulse-signal counted value from the encoder 12. That is, the MPU 80 switches the shift range to the target range by rotating the motor 20 while feeding back the rotation state of the rotor 23 (motor 20). The above control by the MPU 80 may be referred to as a usual drive control.

Figure 3:
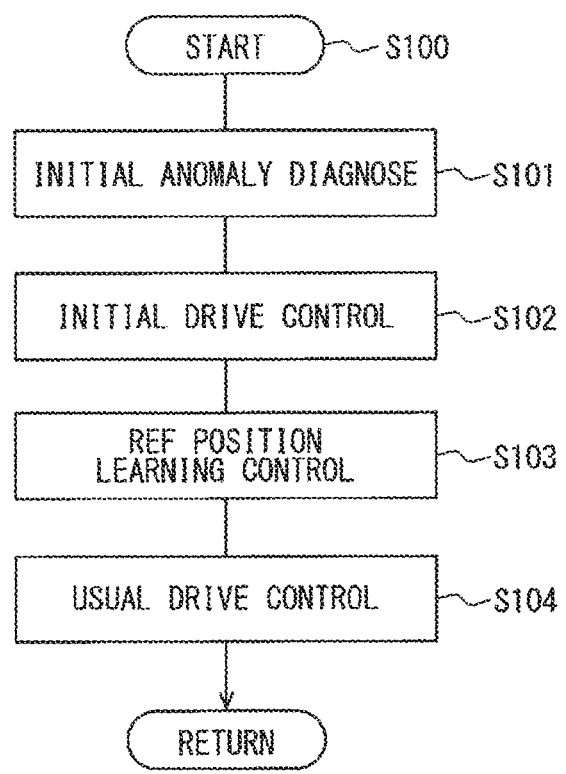
FIG. 3 is a flowchart diagram illustrating a process for controlling a motor by the control apparatus.

The following will explain a control for the motor 20 by the MPU 80 with reference to FIG. 3. It is further noted that a flowchart or processing of the process in the present application includes sections (also referred to as steps), which are represented, for instance, as S100, S101. Further, each section can be divided into several sections while several sections can be combined into a single section. Furthermore, each of thus configured sections can be referred to as a module, device, means, or controller and achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

When an ignition switch is turned on, i.e., the vehicle's power is turned on, the shift-by-wire system 1 is activated to start the present process S100. At S101, the MPU 80 performs an initial anomaly diagnosis. To be specific, the MPU 80 diagnoses whether an anomaly occurs in each element or portion, such as the relay 65, of the shift-by-wire system 1. When an anomaly is detected, the driver of the vehicle is notified of the anomaly arising in the shift-by-wire system 1 by such alarming as displaying an alarm lamp on the display apparatus 7. For example, when any anomaly is not detected at S101, the processing proceeds to S102, where the MPU 80 performs the above initial drive control. This controls the rotation of the actuator 10 (motor 20) appropriately. After S102, the processing proceeds to S103.

At S103, the MPU 80 performs the above reference position learning control, which may be also referred to as a reference position learning process. This matches the reference position with the limit position of the working span of the detent plate 32, enabling a usual drive control of the motor 20 subsequently. When performing the learning of the reference position at S103, the MPU 80 rotates the motor 20 while restricting the electric currents that flow through the windings 22 and the MOSs 61, 62, and 63 by using the current limiting circuit 75. After S103, the processing proceeds to S104, where the MPU 80 performs the above usual drive control. This changes the shift range of the automatic transmission 3 into the range which the driver of the vehicle intends to select. When the ignition switch is turned off, the processing exits from the present process S100.

Figure 4:
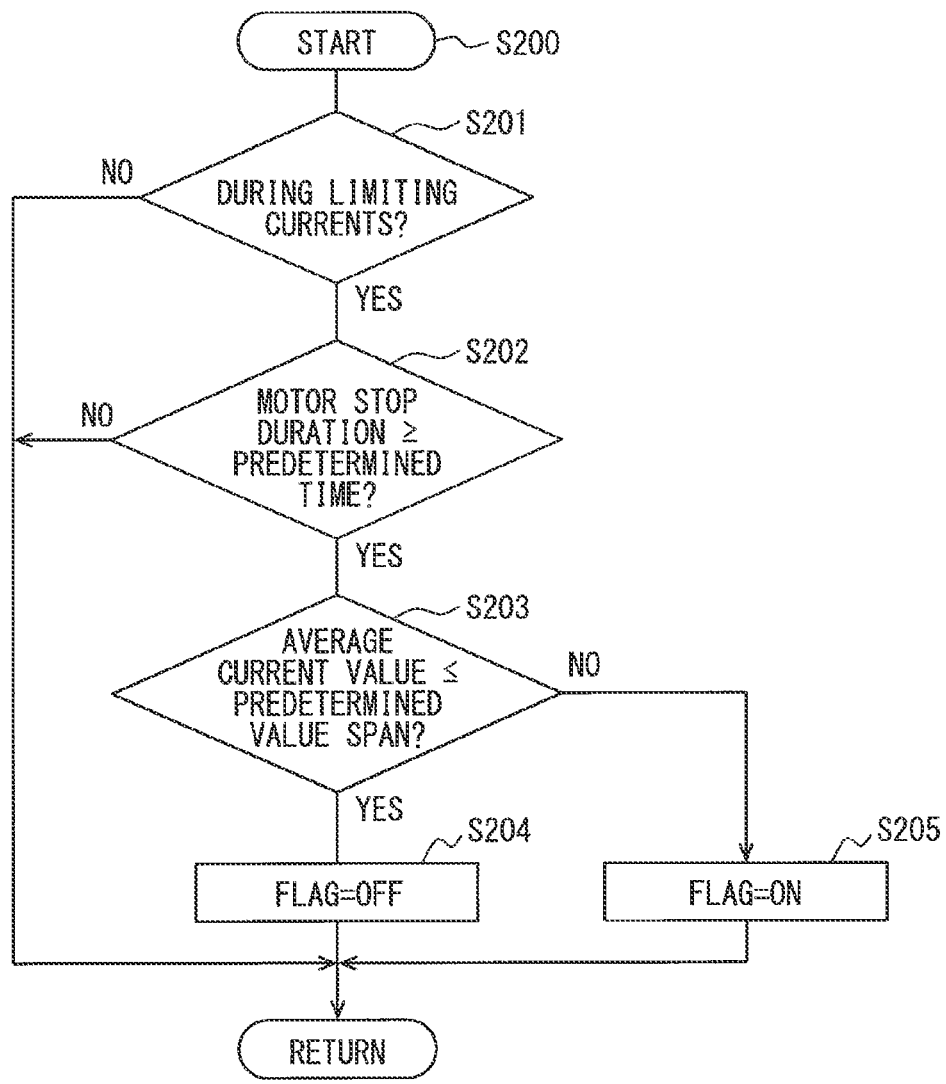
FIG. 4 is a flowchart diagram illustrating a process for detecting an anomaly by the control apparatus.

The MPU 80 includes an anomaly detection section 82 as a functional section. The following will explain a process about anomaly detection for the current limiting circuit 75 by the anomaly detection section 82 of the MPU 80 with reference to FIG. 4. When an ignition switch is turned on, i.e., the vehicle's power is turned on, the shift-by-wire system 1 is activated to start the present process S200.

At S201, the MPU 80 (i.e., the anomaly detection section 82) determines whether or not the present state is an electric current restricted state where the current limiting circuit 75 restricts the electric currents that flow through the windings 22 and the MOSs 61, 62, and 63. When it is determined that the present state is the electric current restricted state (S201: YES), the processing proceeds to S202. When it is determined that the present state is not the electric current restricted state (S201: NO), the processing exits from the present process S200.

In the present embodiment, only when the reference position learning control is performed at S103, the current limiting circuit 75 restricts the electric currents that flow through the windings 22 and the MOSs 61, 62, and 63, as mentioned above. Affirmatively determining as YES at S201 is only during performing the reference position learning control.

When it is determined as NO at S201, the processing exits from the present process S200; then, when the ignition switch is still turned on, the present process S200 is started again.

At S202, the MPU 80 (i.e., the anomaly detection section 82) determines whether the halt state (i.e., stop duration) of the motor 20 continues for a predetermined time period. To be specific, the MPU 80 determines that the motor 20 is halted or stopped when the drive signals outputted from the MOS drive circuit 72 are fixed to predetermined two phases, and determines whether a time period of 50 ms or more elapses.

When it is determined that the halt state of the motor 20 continues a predetermined time period (50 ms) or greater (S202: YES), the processing proceeds to S203. When it is determined that the halt state of the motor 20 does not continue a predetermined time period (50 ms) or greater (S202: NO), the processing exits from the present process S200. When it is determined as NO at S202, the processing exits from the present process S200; then, when the ignition switch is still turned on, the present process S200 is started again.

At S203, the MPU 80 (i.e., the anomaly detection section 82) determines whether the average of the current value detected by the current detection circuit 74 is within a predetermined value span. To be specific, the MPU 80 determines whether the average of the current value detected by the current detection circuit 74 is within ±1 (A) with respect to a predetermined current value.

When it is determined that the average of the current value detected by the current detection circuit 74 is within a predetermined value span (S203: YES), the processing proceeds to S204. When it is determined that the average of the current value detected by the current detection circuit 74 is not within a predetermined value span (i.e., is outside of the predetermined value span) (S203: NO), the processing proceeds to S205.

At S204, the MPU 80 (i.e., the anomaly detection section 82) turns off an anomaly-related flag of the current limiting circuit 75. The processing exits from the present process S200 after S204. At S205, the MPU 80 (i.e., the anomaly detection section 82) turns on the anomaly-related flag of the current limiting circuit 75. The processing exits from the present process S200 after S205.

The MPU 80 (i.e., the anomaly detection section 82) determines that any anomaly does not arise in the current limiting circuit 75 when the anomaly-related flag of the current limiting circuit 75 is turned off after exiting from the present process S200. The usual drive control at S104 is thereby started.

In contrast, the MPU 80 (i.e., the anomaly detection section 82) determines that an anomaly, which prevents the electric currents from appropriately flowing through the windings 22 and the MOSs 61, 62, and 63, arises in the current limiting circuit 75 when the anomaly-related flag of the current limiting circuit 75 is turned on after exiting from the present process S200. When such an anomaly is detected, the driver of the vehicle is notified of the anomaly arising in the shift-by-wire system 1 by such alarming as displaying an alarm lamp on the display apparatus 7. In addition, the MPU 80 does not start a usual drive control at S104 when the anomaly-related flag of the current limiting circuit 75 is turned on. The anomaly detection section 82 of the MPU 80 may be referred to as an anomaly detection controller, device, or means in the process S200 and subsequent processing.

Figure 5:
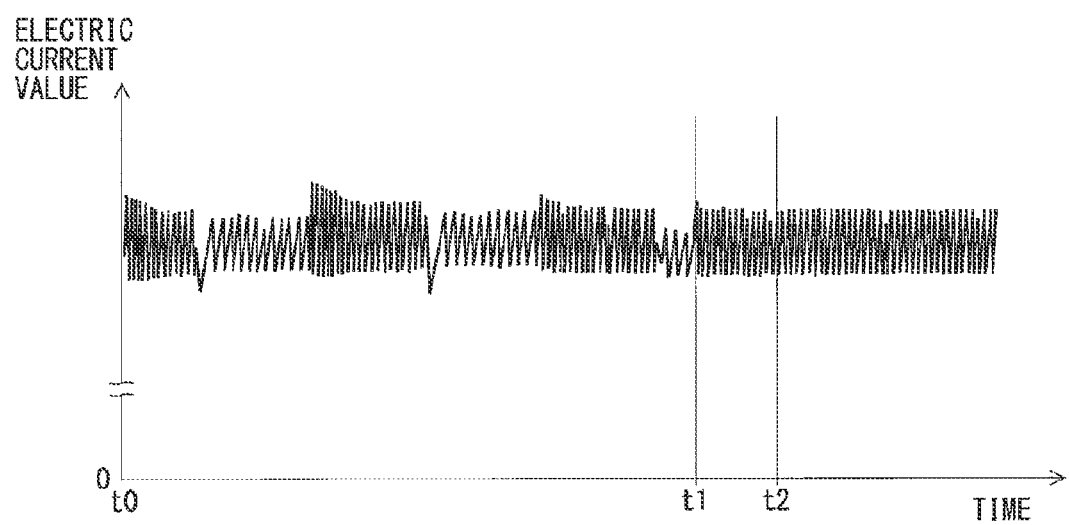
FIG. 5 is a diagram illustrating time-based variations in a current value of electric currents detected by a current detection circuit when the control apparatus functions as a reference position learning controller and an anomaly detection controller.

FIG. 5 illustrates a time-based variation in a current value of electric current detected by the current detection circuit 74 when the MPU 80 functions as the reference position learning controller and the anomaly detection controller. As indicated in FIG. 5, when the reference position learning control is started at the time t0, the motor 20 rotates under the two-phase current application mode. At this time, the current value of the electric currents flowing through the merging point P1 is comparatively unstable. When at the time t1 the detent plate 32 stops at the limit position (position corresponding to P range or D range) of the working span to stop the motor 20, the current value of the electric currents that flow through the merging point P1 is stabilized comparatively.

In the present embodiment, after a predetermined time period (e.g., 50 ms) elapses (at the time t2) since the motor 20 stops (at the time t1), the MPU 80 determines at S203 whether the average of the current value detected by the current detection circuit 74 is within a predetermined value span. That is, in the present embodiment, the MPU 80 performs the anomaly detection for the current limiting circuit 75 under the state where the current value of the electric currents that flow through the merging point P1 is comparatively stable.

As explained above, the present first embodiment is provided with the followings (1) to (4).

(1) The ECU 60 controls the motor 20, which includes windings 22 with a plurality of phases; the motor 20 rotates on electric power supplied from the battery 2 to rotate and drive the detent plate 32. The ECU 60 includes the MOSs 61, 62, and 63, the MPU 80, the current detection circuit 74, the current limiting circuit 75, the reference position learning controller, and the anomaly detection controller.

The MOSs 61, 62, and 63 are provided so as to correspond to the respective phases of the windings 22. The MOSs 61, 62, and 63 permit the current application to the corresponding windings 22 by carrying out the ON operation. The MOSs 61, 62, and 63 shut down the current application to the corresponding windings 22 by carrying out the OFF operation. The MPU 80 controls the ON/OFF operation of the MOSs 61, 62, and 63 to control the driving of the motor 20. The current detection circuit 74 detects the current value of the electric currents that flow through the windings 22 and the MOSs 61, 62, and 63.

The current limiting circuit 75 restricts the electric currents flowing through the windings 22 and the MOSs 61, 62, and 63 such that the average of the current value of the electric currents detected by the current detection circuit 74 is within a predetermined value span. The MPU 80 functions as the reference position learning controller to perform a reference position learning control that restricts the electric currents that flow through the windings 22 and the MOSs 61, 62, and 63 by using the current limiting circuit 75 while rotating the motor 20 until the detent plate 32 stops at the limit position of a working span, thereby learning the reference position of the motor 20. The anomaly detection section 82 of the MPU 80 functions as an anomaly detection controller to detect an anomaly in the current limiting circuit 75 based on the current value detected by the current detection circuit 74 when or while the reference position is learned (i.e., during the reference position learning control).

Under the above configuration, when the reference position of the motor 20 is learned, the motor 20 is rotated while the current limiting circuit 75 restricts the electric currents that flow through the windings 22 and the MOSs 61, 62, and 63 based on the current value detected by the current detection circuit 74. This suppresses (i) the change in the current value of each phase due to such variations as the temperature variations, time-based variations, and (ii) the change in the torque of the motor 20. The learning accuracy of the reference position can be thus raised irrespective of the variations of the conditions, such as temperature variations, time-based variations.

Further, the anomaly detection section 82 can detect an anomaly in the current limiting circuit 75 based on the current value detected by the current detection circuit 74. This can avoid the learning of a reference position under the state where an anomaly occurs in the current limiting circuit 75. The incorrect learning of the reference position is thus prevented from causing an out-of-control situation or a malfunction of the motor 20.

(2) The anomaly detection section 82 can detect an anomaly in the current limiting circuit 75 based on the current value detected by the current detection circuit 74 after a predetermined time period elapses since the rotation of the motor 20 stops due to the detent plate 32 stopping at the limit position of the working span. That is, after a predetermined time period elapses since the rotation of the motor 20 stops, an anomaly in the current limiting circuit 75 is detected under the state where the current value of the electric currents that flow at the merging point P1 is stabilized. The anomaly detection in the current limiting circuit 75 can be therefore performed with a high accuracy.

(3) The anomaly detection section 82 determines that the current limiting circuit 75 is normal when the average of the current value detected by the current detection circuit 74 is within a predetermined value span. In contrast, the anomaly detection section 82 determines that the current limiting circuit 75 is anomalous when the average of the current value detected by the current detection circuit 74 is outside of the predetermined value span. Such a comparatively easy procedure is thus used for the anomaly detection in the current limiting circuit 75; this can shorten the time for the anomaly detection while suppressing the processing load in the anomaly detection section 82.

(4) The shift-by-wire system 1 in a vehicle includes the ECU 60, the motor 20 controlled by the ECU 60, and the detent plate 32 that switches the shift range of the vehicle by being rotated and driven by the motor 20. The ECU 60 can improve the learning accuracy of the reference position irrespective of the variations in conditions, such as temperature variations, time-based variations. In addition, detecting an anomaly in the current limiting circuit 75 can prevent the motor 20 from malfunctioning and becoming out-of-control. The ECU 60 is thus suitable for controlling the shift-by-wire system 1.

(Other Embodiments)

The above first embodiment explains an example configuration in which the anomaly detection section 82 detects an anomaly in the current limiting circuit 75 based on the current value detected by the current detection circuit 74 after a predetermined time period elapses since the rotation of the motor 20 stops due to the detent plate 32 stopping at the limit position of the working span. In contrast, another embodiment may provide another example in which, before the stop of the motor 20, the anomaly detection section 82 detects an anomaly in the current limiting circuit 75 based on the current value detected by the current detection circuit 74 during performing a reference position learning control while restricting the electric currents that flow through the windings 22 and the MOSs 61, 62, and 63 in the current limiting circuit 75.

Further, the above first embodiment explains an example configuration in which the motor is rotated under a two-phases current application mode, which switches the current application phases one by one while applying electric currents to two phases among three phases of the windings, while performing the reference position learning control. In contrast, another embodiment may provide another example in which the motor is rotated under a one-phase-and-two-phases current application mode, which alternately switches between one-phase current application and two-phases current application while performing the reference position learning control. The one-phase current application is to apply electric currents to one phase among three phases of the windings; the two-phases current application is to apply electric currents to two phases among three phases of the windings.

In addition, another embodiment may provide another example configuration to have as a control target a motor which has windings with four or more phases. In addition, the motor as a control target may not be limited to a switched reluctance (SR) motor but be a synchronous brushless motor as long as the rotational position of the motor is detected based on the output signals (pulse signals) from an encoder to switch current application phases.

Further, the above first embodiment explains an example configuration in which a magnetic encoder is used as an encoder that detects a relative rotational position of the motor. In contrast, another embodiment may provide another example in which an optical encoder or a brush-type encoder may be used. Further, an encoder may not be limited to one that outputs pulse signals with A phase or B phase, but may be one that outputs pulse signals with phase Z (for indexes) in addition to A phase and B phase.

In addition, in another embodiment, a control apparatus need not to include a relay that permits or shuts down the supply of the electric power from a power source to a motor. In addition, in another embodiment, the number of recessed portions of a detent plate may not be limited to a specific number. That is, the number of ranges of an automatic transmission that applies the present disclosure is not limited to four.

The shift-by-wire system according to the present disclosure may be applied to a continuous variable transmission (CVT) or an automatic transmission (AT) of a hybrid vehicle (HV), which switches four positions of "P", "R", "N", and "D" as mentioned in the above first embodiment, but also to range switching such as a parking mechanism of an electric vehicle (EV) or hybrid vehicle (HV) that switches between two positions of "P" and "notP".

Further, the above first embodiment explains an example configuration in which a detent mechanism includes a detent roller and a plurality of recessed portions formed in a detent plate (a driving target) provided in a manual shaft. In contrast, another embodiment may provide another example in which a detent mechanism including a detent roller and a plurality of recessed portions is arranged near a decelerator in an actuator. In addition, as long as a rotational position of a driving target is held in a predetermined position, not only the detent mechanism including a detent roller and recessed portions, but also a detent mechanism including other components or elements.

In addition, a control apparatus according to the present disclosure may apply to not only a shift-range switching apparatus but also a variety of switching apparatuses each having a synchronous brushless motor as a driving source.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A control apparatus controlling a motor that includes windings with a plurality of phases, the motor rotating on electric power from a power source to rotate and drive a driving target, the control apparatus comprising:
a plurality of switching devices provided to correspond to the respective phases of the windings, each switching device permitting current application to corresponding windings by performing ON operation and shutting down the current application to the corresponding windings by performing OFF operation;
a drive controller that controls driving of the motor by controlling the ON operation or the OFF operation of each switching device;
a current detection circuit that detects a current value of electric currents flowing through the windings and the switching devices;
a current limiting circuit that restricts the electric currents flowing through the windings and the switching devices so that an average of the current value detected by the current detection circuit is within a predetermined value span;
a reference position learning controller that performs a reference position learning control to rotate the motor until the driving target stops at a limit position of a working span while restricting the electric currents flowing through the windings and the switching devices by using the current limiting circuit, to learn a reference position of the motor; and
an anomaly detection controller that detects an anomaly in the current limiting circuit based on the current value detected by the current detection circuit during the reference position learning control performed by the reference position learning controller.

2. The control apparatus according to claim 1, wherein the anomaly detection controller detects the anomaly in the current limiting circuit based on the current value detected by the current detection circuit after a predetermined time period elapses since rotation of the motor stops due to the driving target stopping at a limit position of a working span.

3. The control apparatus according to claim 1, wherein the anomaly detection controller
determines that the current limiting circuit is normal when the average of the current value detected by the current detection circuit is within a predetermined value span, and
determines that the current limiting circuit is anomalous when the average of the current value detected by the current detection circuit is outside of the predetermined value span.

4. A shift-by-wire system in a vehicle, comprising:
the control apparatus according to claim 1,
the motor controlled by the control apparatus; and
the driving target that switches a shift range of the vehicle by being rotated and driven by the motor.

* * * * *